United States Patent [19]

Worthington et al.

[11] Patent Number: 4,825,796
[45] Date of Patent: May 2, 1989

[54] CABLE GRIP DEVICES

[75] Inventors: Peter Worthington, Marchwood; John N. Russell, Ringwood, both of Great Britain

[73] Assignee: STC PLC, London, England

[21] Appl. No.: 230,177

[22] Filed: Aug. 9, 1988

[30] Foreign Application Priority Data

Aug. 20, 1987 [GB] United Kingdom ................. 8719691

[51] Int. Cl.$^4$ ............................................. B63B 21/08
[52] U.S. Cl. ..................... 114/199; 188/65.1
[58] Field of Search ................ 74/543, 544, 551.9; 114/199; 182/5, 6, 7, 235; 188/65.1, 65.2, 65.3; 254/389

[56] References Cited

U.S. PATENT DOCUMENTS

| 294,629 | 3/1884 | Jenkins | 188/65.1 |
| 4,090,584 | 5/1978 | Wagner | 182/5 |

FOREIGN PATENT DOCUMENTS 1287842  9/1972  United Kingdom.

Primary Examiner—Duane A. Reger
Attorney, Agent, or Firm—Lee & Smith

[57] ABSTRACT

A cable grip device, known as a "stopper", suitable for holding submarine cables during laying and recovery operations on board a ship, comprises a conventional helically wound stopper modified to have a low coefficient of friction over an internal surface portion (1A) and a higher coefficient of friction portion over a surface (1B), which it is found enhances the tensile load which the stopper can bear particularly when used for smooth surfaced deep water submarine cables.

7 Claims, 3 Drawing Sheets

STOPPER PRIOR TO ATTACHMENT TO CABLE

| OVERALL LENGTH | 3.0 |
| LAY LENGTH | 200 mm |
| WIRE SIZE | 10 × 4.06 mm |
| INTERNAL DIAMETER | 21.8 mm |

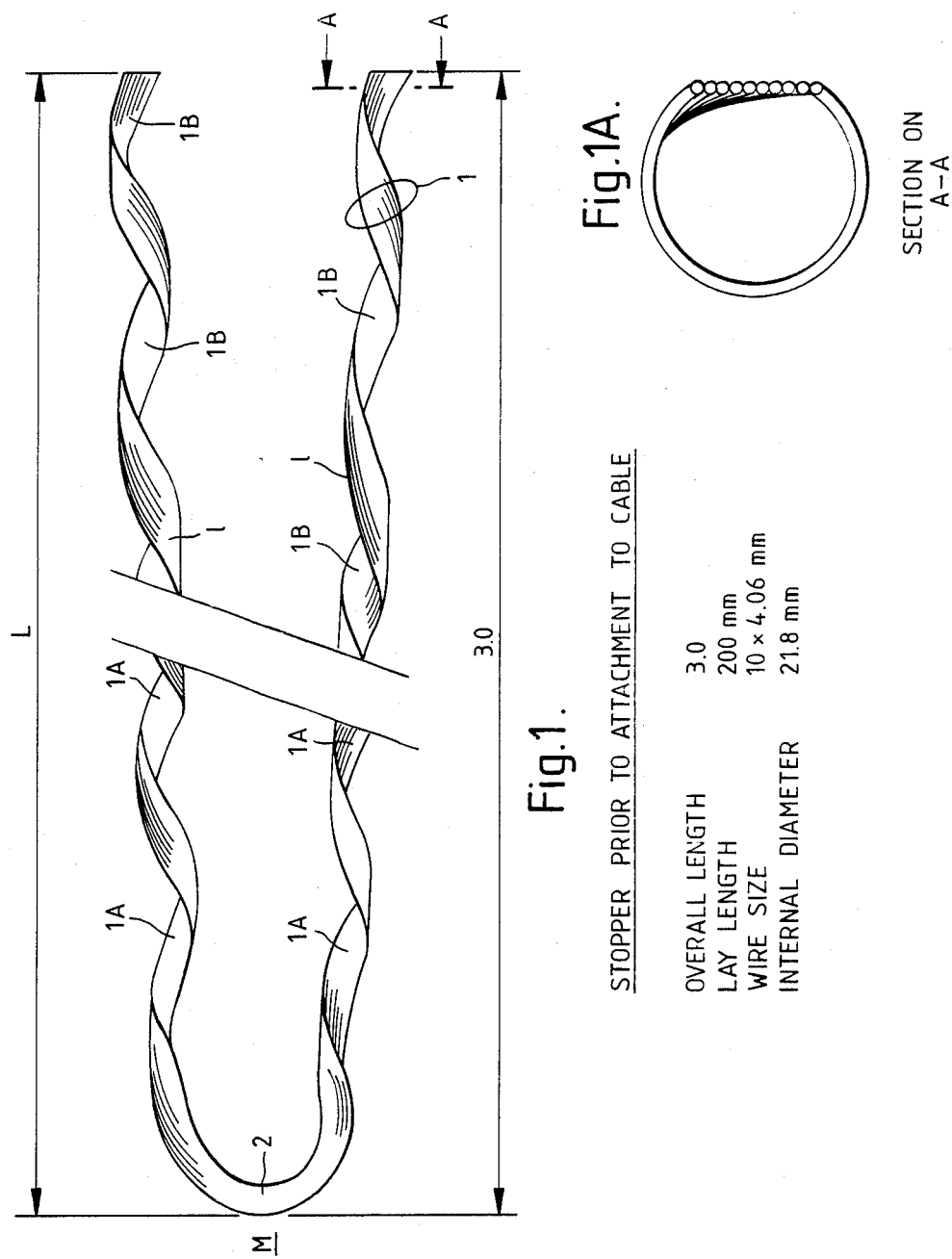

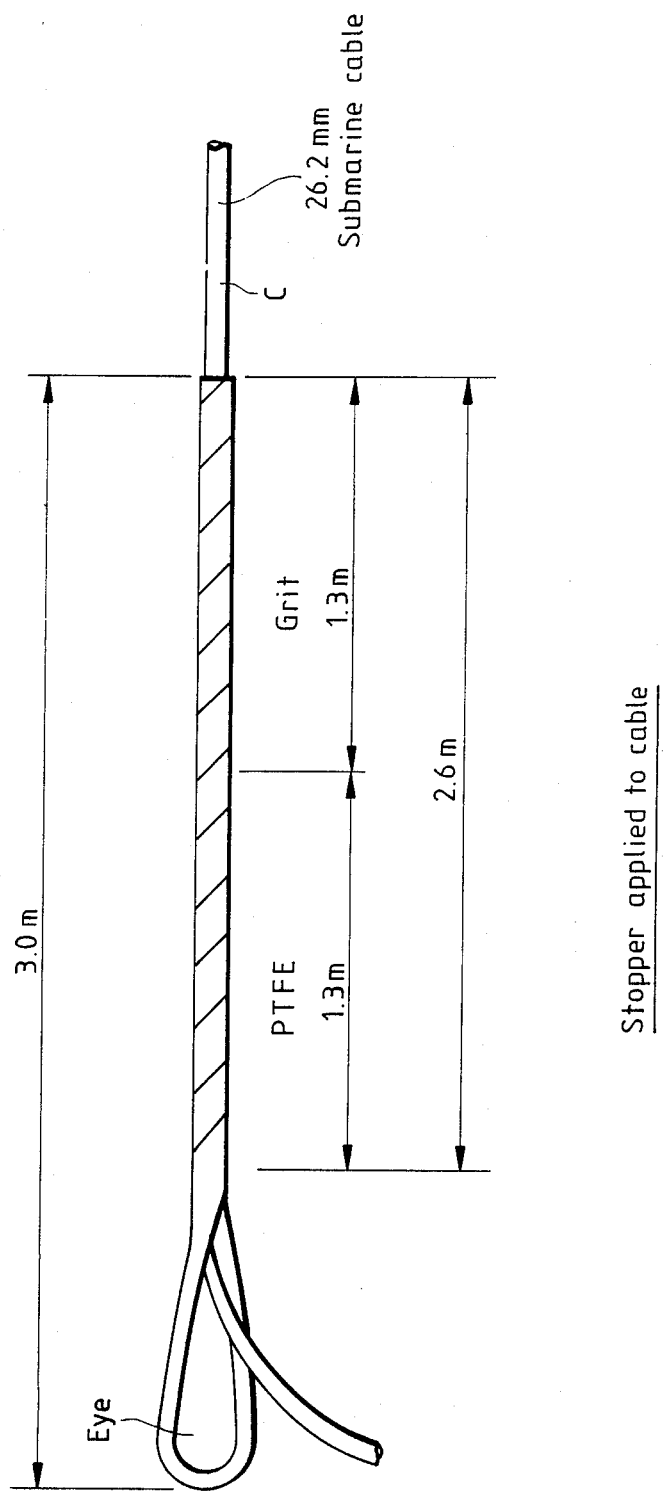

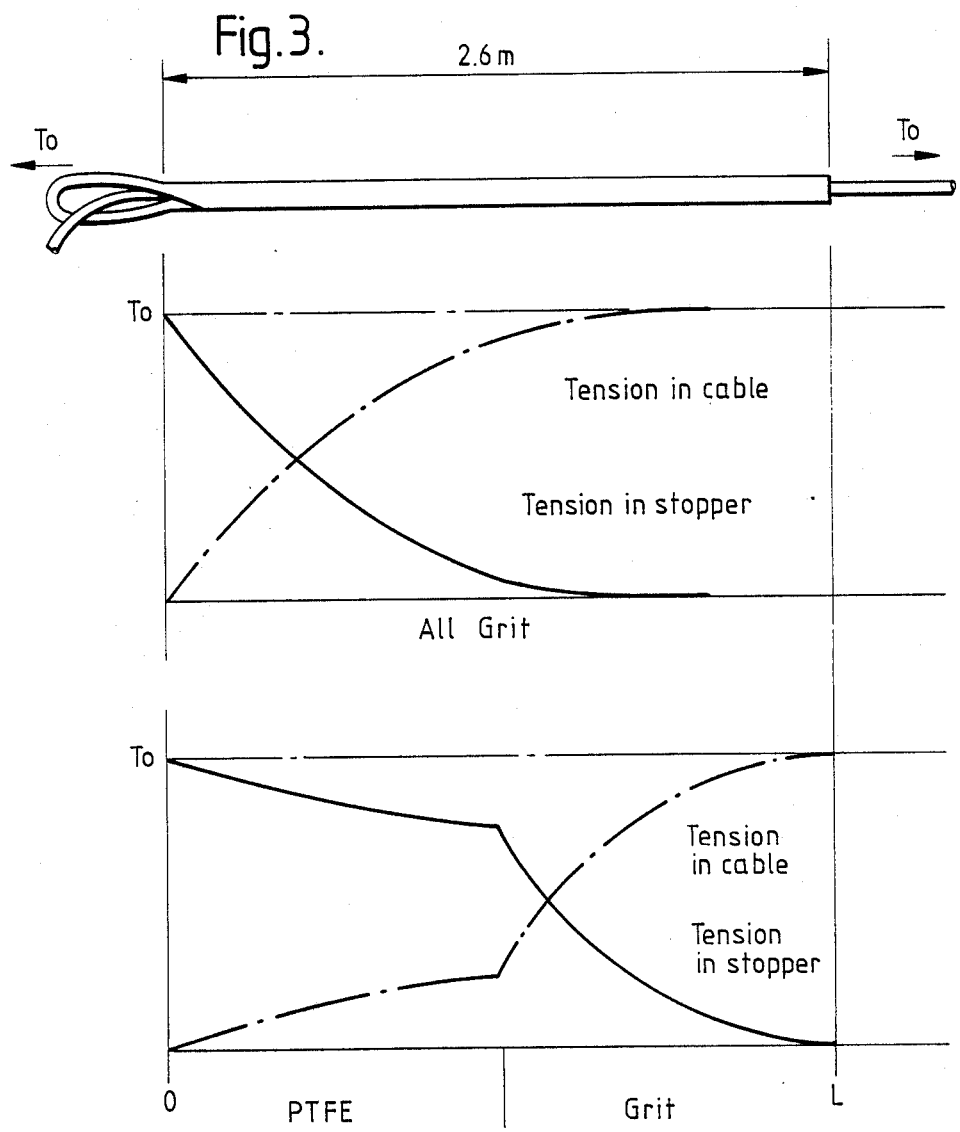
Top
    Conventional Stopper — All gritted wires
Bottom
    New Stopper — 50% PTFE region / 50% grit

CABLE GRIP DEVICES

BACKGROUND OF THE INVENTION

This invention relates to cable grip devices, particularly such a cable grip, known as a "stopper", suitable for use on cables of small diameter with thin-walled polymer sheaths.

DISCUSSION OF PRIOR ART

In laying and retrieving submarine cables on the seabed it is often necessary to hold a cable end on board the laying or recovery ship while repairs or jointing is carried out on board the ship. This is normally done by means of a cable stopper, an example of which is shown in British Patent specification No. 1287842. This stopper or dead end comprises a grouping of wire elements which have been helically preformed over their full length and return bent at their mid point thereby to define a bight and a pair of leg portions. Each leg portion comprises a half-set of helical elements preformed to an internal diameter less than the diameter of the cable which they are intended to grip.

In addition it has been our practice in the past to use cable stoppers of this general type but with a coating of grit over the whole surface of the leg portions in order to increase the overall grip and thereby the tensile load which the stopper will be able to support.

It is an object of the present invention to design a stopper which has increased tensile load performance particularly for use on cables of small diameter with thin-walled polymer sheaths.

SUMMARY OF THE INVENTION

According to the present invention there is provided a helically preformed stopper for use as a dead-end for a linear body having a generally smooth outer surface, comprising a pair of elongated leg portions helically preformed with a predetermined hand of lay, and an intermediate bight portion integral with said pair of leg portions, said stopper having a gripping surface providing a lower coefficient of friction near the bight portion and a higher coefficient of friction farther away from the bight portion.

In a preferred form the portion of the stopper nearer the bight is coated with PTFE and the portion farther from the bight is coated with a grit.

BRIEF DESCRIPTION OF THE DRAWINGS

In order that the invention can be clearly understood reference will now be made to the accompanying drawings in which:

FIG. 1 shows schematically cable stopper according to an embodiment of the present invention;

FIG. 1A is a cross-section on an enlarged scale at the point A—A of FIG. 1.

FIG. 2 shows the cable stopper of FIG. 1 applied to an optical fibre submarine cable having a polyethelene sheath and FIG. 3 shows tension curves over the length L of the stopper and the cable of FIG. 2 and, in addition, similar curves achieved for a stopper according to the prior art.

DESCRIPTION OF THE PREFERRED EMBODIMENTS

Referring to FIG. 1 and FIG. 1A the stopper comprises a grouping of ten high tensile steel wires, each approximately 4 mm in diameter. They are laid up side by side to form a laminar configuration, as can be seen from FIG. 1A, and the wires are helically preformed over their full length L and return bent at their mid point M thereby to define a bight 2. The leg portions 1 each comprise a half-set of helical elements preformed to an internal diameter less than the diameter of the cable C shown in FIG. 2, to provide a predetermined hand of lay which may be of differeing pitch.

The wire elements 1 are glued together, possibly with an epoxy resin glue, to hold them in their laminar helically bent configuration and FIG. 1A attempts to show a view of the stopper of FIG. 1 looking along the arrows A—A in FIG. 1.

The internal surface 1A of the leg portions 1 is coated with PTFE or other suitable low friction material over a portion of the length equivalent to about half the length L and near the bight portion 2. This is indicated also in FIG. 2. This PTFE coating is applied to the wires by any suitable method, such as by the use of PTFE tape. The remaining portion of the legs 1 have an adhesive applied to their inner surface 1B and a fine grit embedded in the adhesive to provide a high friction surface over approximately the other half of the length L remote from the bight portion 2. This is also indicated in FIG. 2. Thus in the embodiment described the overall length L of the stopper is about 3 meters, about 1.3 meters being gritted, the next adjacent 1.3 meters having the low friction PTFE or like material, and the remainder forming the eye or bight portion.

We have found that when the stopper is snapped over the cable during a repair or splicing operation on board a ship and the eye of the stopper is taking the tensile load on the cable, which could be as high as ten tons, the portion covered with low friction material tends to slip and thus reduce in diameter to better grip the cable than with the previous stoppers which are in all respects similar to the one shown in the drawings, except that the whole length is coated with a grit in adhesive on the inner surfaces.

PRINCIPLE OF OPERATION

In the length of the stopper, the total tensile load is transferred from cable to stopper. If the tension at the eye of the stopper is To, the tension along the stopper is $$T = T_o e^{-\mu \alpha}$$

where $\mu$ = coefficient of friction between stopper and cable
$\alpha$ = angle of wrap around cable.

By reducing $\mu$, the rate at which the tension drops can be reduced, so that a longer length of stopper has high tension in the wires.

The tension in the wires produces a radial gripping force on to the cable which transfers the load from stopper to cable.

By increasing the length of the stopper in tension the effective gripping force is increased. FIG. 3 shows this.

Referring to FIG. 3 this shows in the upper curve the tension in the cable on the one hand and the tension in the stopper on the other hand for a stopper which is covered in grit throughout its length on its inner surface. In the lower part of FIG. 3 is shown the curves for the stopper according to the embodiment of the invention as shown in FIGS. 1 and 2, in which half the length of the legs have been coated with low friction material (PTFE) and the other half has been gritted.

The effective gripping force acting on the cable is proportional to the area under the curve of stopper tension versus length along the stopper.

The use of a low friction region close to the eye of the stopper increases the area under the tension versus length curve and hence increases the compressive force between stopper and cable.

The provision of a low friction region close to the eye of the stopper can also be achieved by changing the pitch of the helix.

What is claimed is:

1. A helically preformed stopper for use as a dead-end for a linear body having a generally smooth outer surface, comprising a pair of elongated leg portions, helically preformed with a predetermined hand of lay, and an intermediate bight portion integral with said pair of leg portions, said stopper having a gripping surface providing a lower coefficient of friction near the bight portion and a higher coefficient of friction farther away from the bight portion.

2. A stopper as claimed in claim 1, wherein the portion nearer the bight has its gripping surface coated with a low friction material such as PTFE and the remaining portion of the gripping surface farther from the bight coated with a grit embedded in an adhesive material.

3. A stopper as claimed in claim 1 comprising a group of high tensile steel wires held together with adhesive and bent to provide said helically preformed leg portions and intermediate bight portion.

4. A stopper as claimed in claim 1, wherein the overall length is approximately three meters.

5. A stopper as claimed in claim 1, wherein the gripping surface having the lower coefficient friction has approximately the same length as the gripping surface having the high coefficient of friction.

6. A stopper as claimed in claim 1, wherein the difference in coefficient of friction is obtained by difference in the pitch of the helical lay.

7. A stopper as claimed in claim 2, comprising a group of high tensile steel wires held together with adhesive and bent to provide said helically preformed leg portions and intermediate bight portion.

* * * * *